United States Patent
Sartor et al.

[11] Patent Number: 5,286,153
[45] Date of Patent: Feb. 15, 1994

[54] CORROSION-RESISTANT NAIL FOR DRIVING INTO HARD MATERIALS

[75] Inventors: Dietmar Sartor, Mauren, Liechtenstein; Friedrich Groeschel, Buchs, Switzerland

[73] Assignee: Hilti Aktiengesellschaft, Fürstentum, Liechtenstein

[21] Appl. No.: 980,007

[22] Filed: Nov. 23, 1992

[30] Foreign Application Priority Data

Dec. 2, 1991 [DE] Fed. Rep. of Germany ........ 4139653

[51] Int. Cl.$^5$ .................. F16B 15/00; F16B 15/02
[52] U.S. Cl. .................. 411/441; 411/480; 411/923
[58] Field of Search ............ 411/440, 441, 469, 480, 411/482, 900, 923

[56] References Cited

U.S. PATENT DOCUMENTS

| | | | |
|---|---|---|---|
| 3,377,903 | 4/1968 | Korte | 411/441 |
| 3,921,495 | 11/1975 | Braun et al. | 411/441 |
| 4,802,802 | 2/1989 | Thurner | 411/441 X |
| 4,915,561 | 4/1990 | Buhri et al. | 411/441 X |

FOREIGN PATENT DOCUMENTS

| | | | |
|---|---|---|---|
| 1478868 | 4/1970 | Fed. Rep. of Germany | 411/440 |
| 1290093 | 2/1962 | France | 411/441 |

*Primary Examiner*—Neill R. Wilson
*Attorney, Agent, or Firm*—Anderson Kill Olick & Oshinsky

[57] ABSTRACT

Nails are driven into hard receiving materials such as concrete, rock, metal and the like by explosive powder charge operated setting tools. To achieve the high mechanical strength required for such nails, the nails are formed of two parts, one a shank and the other a head fitted onto the shank. While the head is formed of a deformable corrosion resistant steel, the shank is formed of an austenitic steel alloyed with nitrogen having a very high mechanical strength. The steel forming the shank can only be shaped to a very limited extent, whereby a narrow flange is provided on the rear end of the shank. A disk fitted on the shank serves as a guide for the nails during the driving operation.

4 Claims, 1 Drawing Sheet

CORROSION-RESISTANT NAIL FOR DRIVING INTO HARD MATERIALS

BACKGROUND OF THE INVENTION

The present invention is directed to a nail to be driven into hard receiving materials such as concrete, rock, metal and the like with the nail having a shank and a head axially penetrated by the shank. The head has a larger outside diameter than the shank. The material forming the shank is harder than the material forming the head.

Nails of the above type are driven into hard receiving materials such as concrete, rock, metal and the like by explosive powder charge operated setting tools. These nails can be used for attaching parts to the hard receiving material and they can also be driven directly into the hard receiving materials for use as junction elements. Where the nails are used to fasten parts, they usually have a flange-like head. If they are used as junction elements, the head can have a thread or other engagement means such as a transverse bore. If the nails have a thread, they are usually characterized as bolts or studs.

Such nails are required to have a high mechanical strength because of the stresses developed in the driving operation. Due to the type of application, a high resistance to corrosion is also required. These two requirements have not been combined in nails used in the past. A compromise was found by using austenitic steels to provide corrosion resistance and the slightly lower strength of such nails was found to be advantageous for shaping work in fabrication. Because of the uses of these nails, the lower mechanical strength has been disadvantageous.

Known austenitic steels alloyed with nitrogen have a high mechanical strength and also a high resistance to corrosion. Such nails have not been used, because they are very difficult to form or shape. Shapes of the head required for different applications cannot be formed from such steels.

The fabrication of expensive head shapes, such as disclosed in U.S. Pat. No. 2,353,315, cannot be produced from the austenitic steels alloyed with nitrogen. For these complicated and expensive head shapes, a soft material is used according to U.S. Pat. No. 2,353,315 and is connected in a positively locked manner with the shank; however the shank does not have a high mechanical strength. For the nails disclosed in this patent, a material with low mechanical strength is adequate for fabrication of the shank, since the nails are not being driven into hard receiving materials by explosive powder charge operated setting tools. The use of such known nails in explosive powder charge operated setting tools is barred due to economic considerations, since nails for explosive powder charge operated setting tools are formed mostly as mass produced items, whereby the expensive fabricating manner set forth in U.S. Pat. No. 2,353,315 is unsuitable.

SUMMARY OF THE INVENTION

Therefore, the primary object of the invention is to provide a nail which can be economically manufactured with the nail formed of a shank and a separate head for completely satisfying the corrosion resistance requirement and the mechanical strength requirement. Further, the nail can be manufactured by usual cold forming processes.

In accordance with the present invention, the shank is formed of an austenitic steel alloyed with nitrogen which is harder than the material forming the head of the nail.

As is known, nitrogen alloyed austenitic steels have a high resistance to corrosion as well as a high mechanical strength. Due to the two-part design, that is, a shank and a separate head, the nails formed in accordance with the present invention can be manufactured by cold forming. A head formed of known corrosion resistant steel, preferably an austenitic stainless steel, can be cold worked or cold shaped according to known methods. The shank formed of austenitic steel alloyed with nitrogen can be provided with a small collar or narrow flange in an upsetting operation by cold or semi-cold working methods, so that a positively locked connection exists between the shank and separate head whereby the head remains on the shank even if excessive forces are developed.

In addition, it is preferable to provide a displaceable disk on the nail shank for facilitating the setting process using explosive powder charge operated setting tools where the outside diameter of the disk corresponds to the outside diameter of the head. By matching the outside diameters of disk and head, dual guidance for the nail can be afforded within the explosive powder charge operated setting tool so that the setting process and the proper driving of the nails is facilitated.

Since the head of the nails according to the present invention serves as the stop for parts to be attached as well as an engagement means, the head can be provided with a thread, with the thread expediently formed on the outside circumferential surface of the head. Such an arrangement permits a nut or a threaded sleeve or the like to be threaded onto the head. Instead of an outside thread, it is conceivable to provide the head with an inside thread.

Preferably, the austenitic steel alloyed with nitrogen used for the shank of the nails of the present invention contains the following:

2–22% Mn
1–3% Mo
0.2–1.2% N
15–27% Cr
0–17% Ni

These element percentages affect the steel so that it has the requisite mechanical strength and corrosion resistant properties while permitting the shank to be formed or shaped, even if only to a reduced or lesser degree.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
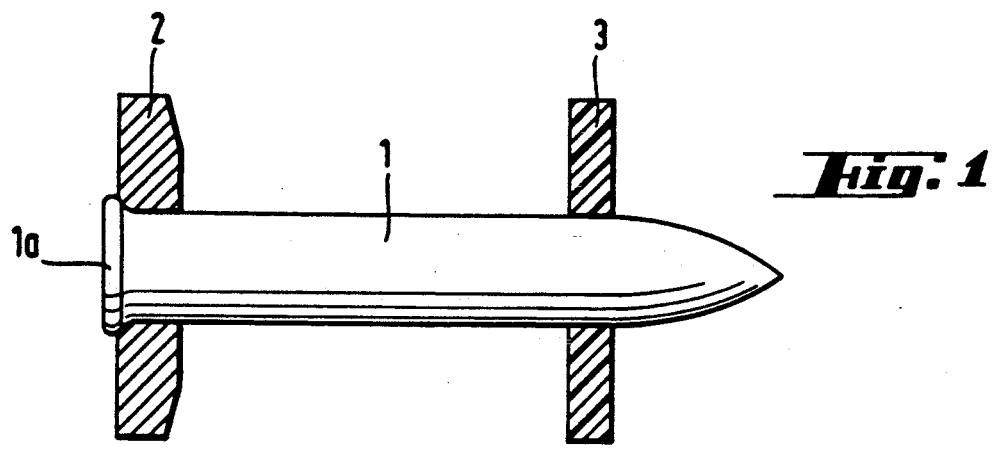
FIG. 1 is a side view, partly in section, of a nail embodying the present invention and having a head at its rear end.

An axially extending nail, shown in FIG. 1, has an elongated shank 1 with a front end to the right and a rear end to the left. In the region of the rear end a head 2 is fitted onto the shank and extends radially outwardly from the shank. Adjacent the front end of the nail a disk 3 is fitted on the shank. As shown in FIG. 1, the shank I has an upset flange 1a at the rear end serving as a positively locked connection for the head. The flange 1a extends laterally outwardly for only a short distance from the outside of the shank since the shank, is formed from austenitic steel alloyed with nitrogen, which limits the extent to which the shank can be worked. Due to the high mechanical strength of the steel used for the shank, the flange 1a in cooperation with the head 2 is entirely adequate to assure that the head is not displaced from the shank when it is driven into a hard receiving material by a setting tool.

Disk 3 adjacent the front end of the shank is, for reasons of cost, preferably formed of plastics material, since it merely serves for guiding the nail during the driving operation. After the driving operation is completed, the disk 3 is no longer necessary, so that in using plastics, the material utilized can be selected so that it is displaced from the nail by deformation.

Figure 2:
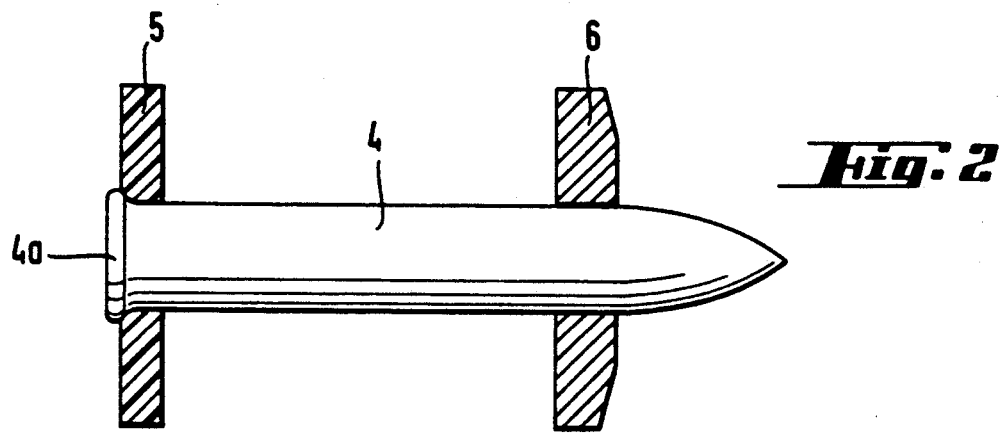
FIG. 2 is a view similar to FIG. 1 with a head displaceably positioned on the front end region of the shank.

In FIG. 2, the nail has a shank 4 with a disk 5 fitted on the shank in the rear end region and a head adjacent the front end region. The head 6 extends radially outwardly from the shank. Disk 5 serves only for guidance during the driving operation, as mentioned above and, if it is formed of plastics material, is automatically displaced from the shank 4 during the driving operation.

At its rear end, the shank 4 has a narrow flange 4a preferably fabricated by cold working, with the flange assuring that the head 6 remains on the shank as it attaches a part or if excessive driving forces are applied to the nail. In this embodiment, the head 6 is disposed in the front end region of the shank and can move rearwardly along the shank during the driving operation, so that after the driving operation is completed, the head is located in the rear end region of the shank and abuts against the flange 4a. Accordingly, the head 6 ends up in a position similar to the head 2 in FIG. 1 only after the completion of the driving operation.

Figure 3:
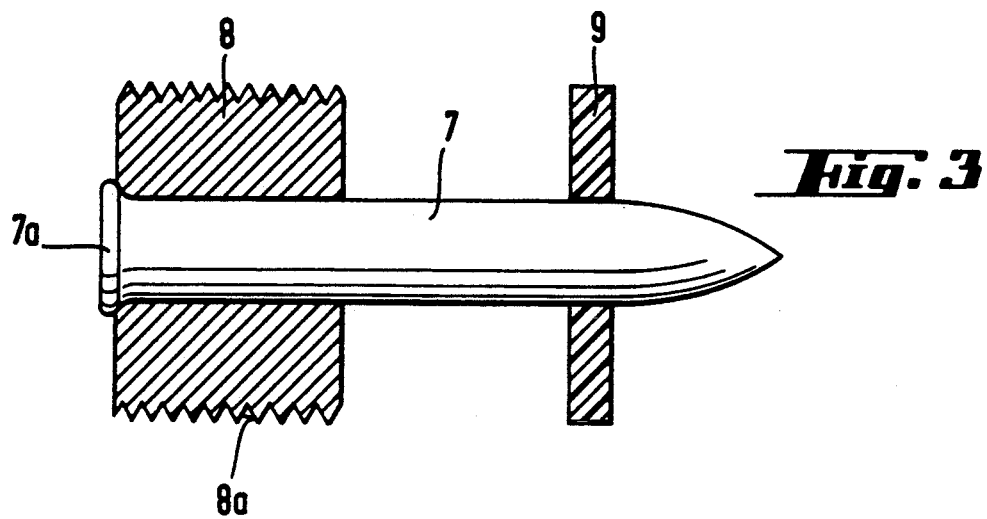
FIG. 3 is a view similar to FIGS. 1 and 2 with the nail shank having a head with a thread on its outer circumferential surface and with the head located at the rear end region of the shank.

Another embodiment of the nail is displayed in FIG. 3 with a head 8 located in the rear end region of the shank 7. Head 8 has a thread 8a on its outer circumferential surface. A flange 7a on the rear end of the shank serves for a positively locked connection between the head 8 and the shank 7. A disk 9, preferably formed of plastics material, is located adjacent the front end region of the shank and serves as a guide during the driving operation. If plastics material is used for the disk 9, it can be displaced or broken up into splinters by deformation during the driving operation.

Instead of using plastics material for the disks, it is also possible to use ordinary metal. When using metal, a very easily deformable material can be utilized, since such disks merely afford a guiding action only during the driving operation.

The following material can be used for the shank:
P 500 (firm Böhler)
24% Cr, 15% Ni, 4% Mn, 2% Mo, 0.45% N
P 900 (firm VSG)
18% Cr, 18% Mn, 2% Mo, 0.75% N The above materials have strengths of a magnitude of 2,000 N/mm$^2$.

We claim:

1. A nail to be driven into hard receiving materials such as concrete, rock, metals and the like comprises an axially elongated shank having an outside diameter, a front end, a rear end, and is formed of a first material, a separate head fitted on said shank with said shank extending through said head, a flange located at the rear end of said shank and extending radially only slightly outwardly from the outside diameter of said shank, said head has an outside diameter greater than the outside diameter of said shank, and projects radially outwardly from said flange, a disk displaceably mounted on said shank and having an outside diameter corresponding to the outside diameter of said shank, said head is formed of a corrosion resistant second material not as hard as the first material of said shank, and said first material comprises an austenitic steel alloyed with nitrogen, whereby after the nail is driven said head is in positively locked connection with said flange and said disk is displaced from the nail.

2. A nail, as set forth in claim 1, wherein said head has a thread thereon.

3. A nail, as set forth in claim 2, wherein said thread is located on an outer circumferential surface of said head.

4. A nail, as set forth in claim 1, wherein said austenitic steel alloyed with nitrogen comprises the following:
2 to 22% Mn
1 to 3% Mo
0.2 to 1.2% N
15 to 26% Cr
0 to 17% Ni.

* * * * *